United States Patent
Kischkel et al.

(10) Patent No.: US 6,797,687 B2
(45) Date of Patent: Sep. 28, 2004

(54) GEMINI SURFACTANT COMPOSITIONS

(75) Inventors: Ditmar Kischkel, Monheim (DE);
Hans-Christian Raths, Monheim (DE);
Manfred Weuthen, Langenfeld (DE);
Michael Elsner, Heiligenhaus (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 0 days.

(21) Appl. No.: 10/214,029

(22) Filed: Aug. 7, 2002

(65) Prior Publication Data

US 2003/0078182 A1 Apr. 24, 2003

(30) Foreign Application Priority Data

Aug. 7, 2001 (DE) .......................................... 101 37 925

(51) Int. Cl.[7] .............................. C11D 1/72; C11D 3/37; C11D 11/02
(52) U.S. Cl. ..................... 510/475; 510/220; 510/224; 510/356; 510/360; 510/413; 510/421; 510/443; 510/444; 510/446; 510/451; 510/452; 510/505; 510/506; 510/535; 568/613; 568/622; 523/400; 523/406
(58) Field of Search ................................. 510/220, 224, 510/356, 360, 413, 421, 443, 444, 446, 451, 452, 475, 505, 506, 535; 568/613, 622; 523/400, 406

(56) References Cited

U.S. PATENT DOCUMENTS

| | | |
|---|---|---|
| 5,318,733 A | 6/1994 | Carduck et al. |
| 5,759,987 A * | 6/1998 | Haerer et al. ................ 510/514 |
| 2003/0008801 A1 * | 1/2003 | Raths et al. ................ 510/421 |
| 2003/0036496 A1 * | 2/2003 | Elsner et al. ................ 510/421 |
| 2003/0078176 A1 * | 4/2003 | Elsner et al. ................ 510/220 |
| 2003/0078182 A1 * | 4/2003 | Kischkel et al. ............ 510/421 |
| 2003/0114348 A1 * | 6/2003 | Kischkel et al. ............ 510/446 |
| 2003/0119703 A1 * | 6/2003 | Elsner et al. ................ 510/421 |

FOREIGN PATENT DOCUMENTS

| | | | | |
|---|---|---|---|---|
| CA | 2300643 A1 | | 5/2000 | |
| DE | 38 16 842 A1 | | 11/1989 | |
| DE | 4321022 | * | 1/1995 | .......... C07C/303/24 |
| DE | 199 53 796 A1 | | 5/2001 | |
| DE | 10121722 | * | 11/2002 | .......... C11D/1/825 |
| DE | 10121724 | * | 11/2002 | .......... C11D/1/825 |
| DE | 10137925 | * | 2/2003 | .......... C08L/29/02 |
| DE | 10152142 | * | 4/2003 | .......... C11D/17/00 |
| EP | 0 486 592 B1 | | 6/1992 | |
| WO | WO 93/02176 A1 | | 2/1993 | |
| WO | WO 94/09111 A1 | | 4/1994 | |
| WO | WO 98/12299 A1 | | 3/1998 | |
| WO | WO 99/35225 A2 | | 7/1999 | |
| WO | WO 00/06688 A1 | | 2/2000 | |

* cited by examiner

*Primary Examiner*—Brian P. Mruk
(74) *Attorney, Agent, or Firm*—Aaron R. Ettelman; Steven J. Trzaska; John E. Drach

(57) ABSTRACT

Mixtures comprising: (a) a gemini surfactant of the formula (I)

$$R^1-CHOH-CH_2-[OCH_2CH_2]_x-O-CH_2-CHOH-R \quad (I)$$

wherein each of R and $R^1$ is a linear or branched alkyl and/or alkenyl group having from 4 to 22 carbon atoms and x is a number from about 5 to about 400; (b) polyethylene glycol are useful as components in laundry detergents, dishwashing detergents and cleaners and for improving the wetting behavior on various surfaces.

21 Claims, No Drawings

GEMINI SURFACTANT COMPOSITIONS

CROSS REFERENCE TO RELATED APPLICATIONS

This application claims the benefit of German patent application number 101 37 925.0, filed on Aug. 7, 2001.

BACKGROUND OF THE INVENTION

The invention relates to mixtures comprising gemini surfactants and polyethylene glycol, optionally in combination with further nonionic surfactants, to a process for the preparation thereof, and to the use of such mixtures in laundry detergents, dishwashing detergents and cleaners and for improving the wetting behavior on various surfaces.

DESCRIPTION OF RELATED ART

For the preparation of laundry detergents, dishwashing detergents and cleaners, preference is given to using surfactant mixtures in solid form, i.e. in the form of granules, flakes, powders, pellets or tablets.

Particularly in the field of machine dishwashing detergents, there is an increased need to be able to incorporate solid surfactant mixtures directly. The consumer now preferably demands combined products comprising dishwashing detergent with incorporated rinse aid for the domestic and also commercial sector. To date, the rinse aid has previously been metered in separately in domestic dishwashers and then released into the wash chamber after the prewash and cleaning operation at just below 40° C.–65° C. In the case of combined dishwashing detergents (e.g. "2 in 1" tablets or powders, i.e. detergents and rinse aids; "3 in 1" tablets or powders, i.e. detergent, rinse aid and regenerating salt), the rinse aid dissolves in a time-delayed manner relative to the detergent and in this way is added to the wash liquor.

Commercial dishwashing machines additionally operate with only a detergent liquor which is merely replaced by adding the wash solution from the previous wash operation. During the entire wash program, no complete water exchange therefore takes place. For this reason, the detergent must also have a foam-suppressing action, be thermally stable over a steep temperature gradient of 85–35° C. and also be sufficiently stable against alkali and active chlorine.

WO 99/35225 (Henkel) describes dishwashing detergent shaped bodies containing surfactants which already comprise rinse aids. In contrast to the present invention, the rinse aid surfactants must be mixed with paraffin for use in the shaped bodies and are additionally surrounded by a coating substance.

WO 00/06688 (Benckiser) also describes compositions for use in a dishwasher. The compounds known for use as rinse aids are mixed, to increase the melting point, with up to 70% polyethylene glycol and must still additionally be incorporated into the dishwashing detergent protecting with with coating substances. As a result of the high proportion of polyethylene glycol, correspondingly less rinse aid substance can be incorporated. The gemini surfactants present in the mixtures according to the invention are not described, and in addition these can be processed with far smaller amounts of polyethylene glycol and incorporated into detergent formulations.

It is an object of the present invention to provide mixtures which can be incorporated into detergent formulations in a simplified manner. In addition, they should exhibit good foaming and cleaning behavior, but in particular very good run-off behavior, i.e. an improvement in the wetting behavior on hard surfaces, and high material compatibility. In addition, it should be possible to incorporate the mixtures according to the invention into detergent formulations in high concentration without the addition of coating substances.

This object was achieved by using chosen surfactants from the gemini surfactant type in combination with polyethylene glycol.

SUMMARY OF THE INVENTION

The present invention is a mixture comprising: (a) a gemini surfactant of the formula (I)

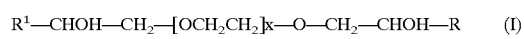

$$R^1\text{—CHOH—CH}_2\text{—[OCH}_2\text{CH}_2\text{]}_x\text{—O—CH}_2\text{—CHOH—R} \quad (I)$$

wherein each of R and $R^1$ is a linear or branched alkyl and/or alkenyl group having from 4 to 22 carbon atoms and x is a number from about 5 to about 400; (b) polyethylene glycol (PEG).

DETAILED DESCRIPTION OF THE INVENTION

Gemini Surfactants

In general, gemini surfactants are prepared by reacting 1,2-epoxyalkanes ($CH_2CHO$—R) or ($CH_2CHO$—R1) or mixtures thereof, where R and R1 are a linear or branched, saturated or unsaturated alkyl and/or alkenyl radical, with polyols.

In this connection, polyol is to be considered as being the collective term for polyhydric alcohols or polyalkylene glycols, i.e. as an organic compound which contains at least two hydroxy groups in the molecule. Polyalkylene glycols are also to be understood as meaning reaction products of polyhydric alcohols with alkoxylation reagents such as ethylene oxide and propylene oxide.

For the purposes of the invention, polyethylene glycol HO—[$OCH_2CH_2$]x—OH is used as polyol.

Particular preference is given to gemini surfactants of the formula (I) where x is 5 to 400, preferably 10 to 100 and in particular 10 to 50.

Preference is also given to mixtures comprising gemini surfactants of the formula (I) where R and R1, independently of one another, are a linear or branched alkyl radical having 4 to 22 carbon atoms, particularly preferably a linear alkyl radical having having 8 to 12 carbon atoms.

In a further embodiment, preference is given to mixtures which comprise gemini surfactants of the formula (I) obtained by reaction of polyethylene glycol with epoxyalkanes, where at least 60%, preferably 90%, in particular at least 95%, of all free hydroxyl groups of the polyethylene glycol are capped by epoxyalkanes.

Preference is also given to mixtures which comprise polyethylene glycol with a molar weight (g/mol) of from 500 to 300,000, preferably 1,000 to 100,000, preferably 1,500 to 50,000 and particularly preferably 1,550 to 20,000.

Very particular preference is given to mixtures which comprise gemini surfactants of the formula (I) where x is 10 to 50, and polyethylene glycol with a molar weight of from 3,000 to 20,000 g/mol.

The mixtures also preferably comprise gemini surfactants of the formula (I) and polyethylene glycol in the ratio (a:b) 100:1 to 1:2, preferably 20:1 to 1:1 and particularly preferably 10:1 to 2:1.

The given ratio is calculated from the amount of gemini surfactant used directly relative to the amount of polyethylene glycol added to the mixture.

Nonionic Surfactants

The mixtures according to the invention can comprise further nonionic surfactants. Typical examples of nonionic surfactants are alkyl and/or alkenyl oligoglycosides, alkoxylates of alkanols, terminally capped alkoxylates of alkanols without free OH groups, alkoxylated fatty acid lower alkyl esters, amine oxides, alkylphenol polyglycol ethers, fatty acid polyglycol esters, fatty acid amide polyglycol ethers, fatty amine polyglycol ethers, alkoxylated triglycerides, mixed ethers or mixed formals, fatty acid N-alkylglucamides, protein hydrolyzates (in particular wheat-based vegetable products), polyol fatty acid esters, sugar esters, sorbitan esters and polysorbates. If the nonionic surfactants contain polyglycol ether chains, these may have a conventional homolog distribution, but preferably have a narrowed homolog distribution.

The further nonionic surfactants are preferably chosen from the group formed by alkyl and/or alkenyl oligoglycosides, alkoxylates of alkanols, in particular fatty alcohol polyethylene glycol ethers or fatty alcohol polyethylene glycol/polypropylene glycol ethers of the formula (III) or fatty alcohol polypropylene glycol/polyethylene glycol ethers of the formula (IV), terminally capped alkoxylates of alkanols without free OH groups, in particular terminally capped fatty alcohol polyethylene glycol/polypropylene glycol ethers or terminally capped fatty alcohol polypropylene glycol/polyethylene glycol ethers, and alkoxylated fatty acid lower alkyl esters and amine oxides.

Particular preference is given to mixtures which comprise, as further nonionic surfactants, preferably alkyl and/or alkenyl oligoglycosides of the formula (II), fatty alcohol polyethylene glycol/polypropylene glycol ethers of the formula (III) or fatty alcohol polypropylene glycol/polyethylene glycol ethers of the formula (IV) or mixtures thereof.

Alkyl and/or Alkenyl Oligoglycosides

In a further embodiment, the mixtures according to the invention comprise alkyl and/or alkenyl oligoglycosides of the formula (II)

$R^2O—[G]_p$ (II)

where $R^2$ is an alkyl and/or alkenyl radical having 4 to 22 carbon atoms, G is a sugar radical having 5 or 6 carbon atoms and p is a number from 1 to 10.

They can be obtained by the appropriate methods of preparative organic chemistry.

The alkyl and/or alkenyl oligoglycosides can be derived from aldoses or ketoses having 5 or 6 carbon atoms, preferably glucose. The preferred alkyl and/or alkenyl oligoglycosides are both alkyl and/or alkenyl oligoglucosides.

The alkyl radical $R^2$ can be derived from primary saturated alcohols. Typical examples are 1-butanol, caproic alcohol, enanthic alcohol, caprylic alcohol, pelargonic alcohol, capric alcohol, 1-undecanol, lauryl alcohol, 1-tridecanol, myristyl alcohol, 1-pentadecanol, cetyl alcohol, palmityl alcohol, 1-heptadecanol, stearyl alcohol, isostearyl alcohol, 1-nonadecanol, arachidyl alcohol, 1-heneicosanol, and behenyl alcohol and technical-grade mixtures thereof, as are obtained, for example, in the hydrogenation of technical-grade fatty acid methyl esters or in the course of the hydrogenation of aldehydes from the Roelen oxo synthesis.

The alkenyl radical $R^2$ can be derived from primary unsaturated alcohols. Typical examples of unsaturated alcohols are undecen-1-ol, oleyl alcohol, elaidyl alcohol, ricinoleic alcohol, linoleyl alcohol, linolenyl alcohol, gadoleyl alcohol, arachidyl alcohol, erucyl alcohol, brassidyl alcohol, palmoleyl alcohol, petroselinyl alcohol, arachyl alcohol, and technical-grade mixtures thereof, which can be obtained as described above.

Preference is given to alkyl or alkenyl radicals $R^2$ which are derived from primary alcohols having 6 to 16 carbon atoms.

Of particular suitability are alkyl oligoglucosides of chain length $C_8–C_{10}$ which are produced as forerunnings in the distillative separation of technical-grade $C_8–C_{18}$-coconut fatty alcohol and may be contaminated with a content of less than 6% by weight of $C_{12}$-alcohol, and also alkyl oligoglucosides based on technical-grade $C_{9/11}$-oxo alcohols.

The alkyl or alkenyl radical $R^2$ may also be derived from primary alcohols having 12 to 14 carbon atoms.

The index number p in the general formula (II) gives the degree of oligomerization (DP), i.e. the distribution of mono- and oligoglycosides and is a number between 1 and 10. While p in a given compound must always be an integer and here in particular can assume the values p=1 to 3, the value p for a specific alkyl oligoglycoside is an analytically determined calculated parameter which in most cases is a fraction.

Preference is given to using alkyl and/or alkenyl oligoglycosides with an average degree of oligomerization p of from 1.1 to 2.0. From a performance viewpoint, preference is given to those alkyl and/or alkenyl oligoglycosides whose degree of oligomerization is less than 2.0 and in particular is between 1.2 and 1.7.

Preference is given to using alkyl and/or alkenyl oligoglycosides of the formula (II) where p is a number from 1 to 3 and $R^2$ is an alkyl radical having 6 to 16 carbon atoms.

Fatty Alcohol Polyethylene Glycol/Polypropylene Glycol Ethers

In a preferred embodiment, use is made of fatty alcohol polyethylene glycol/polypropylene glycol ethers of the formula (III), which are optionally terminally capped,

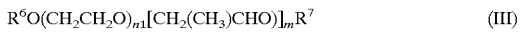

$R^6O(CH_2CH_2O)_{n1}[CH_2(CH_3)CHO]_mR^7$ (III)

in which $R^6$ is a linear or branched alkyl and/or alkenyl radical having 8 to 22 carbon atoms, $R^7$ is H or an alykl radical having 1 to 8 carbon atoms, n1 is a number from 1 to 40, advantageously 1 to 30, preferably 1 to 15, in particular 1 to 10, and m is 0 or a number from 1 to 10.

The alcohols on which the fatty alcohol derivatives are based may either be natural or synthetic in origin.

Fatty Alcohol Polypropylene Glycol/Polyethylene Glycol Ethers

Also suitable are fatty alcohol polypropylene glycol/polyethylene glycol ethers of the formula (IV), which are optionally terminally capped.

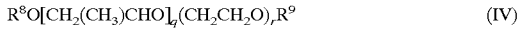

$R^8O[CH_2(CH_3)CHO]_q(CH_2CH_2O)_rR^9$ (IV)

in which $R^8$ is an alkyl and/or alkenyl radical having 8 to 22 carbon atoms, $R^9$ is H or an alkyl radical having 1 to 8 carbon atoms, q is a number from 1 to 5 and r is a number from 0 to 15.

Preference is given to fatty alcohol polyethylene glycol/polypropylene glycol ethers of the formula (III) in which $R^6$ is a linear or branched alkyl radical having 8 to 16 carbon atoms, n1 is a number from 1 to 10, and m is 1 to 5 and $R^7$ is hydrogen. These are addition products of from 1 to 10 mol of ethylene oxide and 1 to 5 mol of propylene oxide onto monofunctional alcohols.

Suitable alcohols are alcohols of natural or synthetic origin. In this connection, it is possible to start from fatty alcohols, oxo alcohols, Shell alcohols and Guerbet alcohols.

The terminally capped compounds of the formula (III) are capped by an alkyl group having 1 to 8 carbon atoms ($R^7$). Compounds of this type are also frequently referred to in the literature as mixed ethers. Suitable representatives are methyl-capped compounds of the formula (III) in which $R^6$ is an aliphatic, saturated, straight-chain or branched alkyl radical having 8 to 16 carbon atoms, n1 is a number from 2 to 7, m is a number from 3 to 7 and $R^7$ is a methyl group. Such compounds can be readily prepared by reacting the corresponding non-terminally capped fatty alcohol polyethylene glycol/polypropylene glycol ethers with methyl chloride in the presence of a base.

Suitable representatives of alkyl-capped compounds are those of the formula (III) in which $R^6$ is an aliphatic, saturated, straight-chain or branched alkyl radical having 8 to 16 carbon atoms, n1 is a number from 5 to 15, m is 0 and $R^7$ is an alkyl group having 4 to 8 carbon atoms. The terminal capping is preferably carried out with a straight-chain or branched butyl group by reacting the corresponding fatty alcohol polyethylene glycol ether with n-butyl chloride or with tert-butyl chloride in the presence of bases.

Instead of the compounds of the formula (III) or in a mixture therewith terminally capped fatty alcohol polypropylene glycol/polyethylene glycol ethers of the formula (IV) may optionally be present. Particularly preferred representatives of the compounds of the formula (IV) are those in which $R^8$ is an aliphatic, saturated, straight-chain or branched alkyl radical having 8 to 16 carbon atoms, q is a number from 1 to 5, r is a number from 1 to 6 and $R^9$ is hydrogen. These are preferably addition products of from 1 to 5 mol of propylene oxide and from 1 to 6 mol of ethylene oxide onto monofunctional alcohols.

Alkoxylated Fatty Acid Lower Alkyl Esters

Suitable further nonionic surfactants are alkoxylated fatty acid lower alkyl esters of the formula (V),

$$R^{10}CO-(OCH_2CHR^{11})_w OR^{12} \quad (V)$$

in which $R^{10}CO$ is a linear or branched, saturated and/or unsaturated acyl radical having 6 to 22 carbon atoms, $R^{11}$ is hydrogen or methyl, $R^{12}$ is a linear or branched alkyl radical having 1 to 4 carbon atoms and w is a number from 1 to 20. Typical examples are the formal insertion products of, on average, 1 to 20 and, preferably, 5 to 10, mol of ethylene oxide and/or propylene oxide into the methyl, ethyl, propyl, isopropyl, butyl and tert-butyl esters of caproic acid, caprylic acid, 2-ethylhexanoic acid, capric acid, lauric acid, isotridecanoic acid, myristic acid, palmitic acid, palmoleic acid, stearic acid, isostearic acid, oleic acid, elaidic acid, petroselic acid, linoleic acid, linolenic acid, elaeostearic acid, arachidic acid, gadoleic acid, behenic acid and erucic acid, and also technical-grade mixtures thereof. The preparation of the product usually takes place by insertion of the alkylene oxides into the carbonyl ester bond in the presence of special catalysts, such as, for example, calcined hydrotalcite. Particular preference is given to reaction products of, on average, 5 to 10 mol of ethylene oxide into the ester bond of technical-grade coconut fatty acid methyl esters.

Amine Oxides

Amine oxides which can be used are compounds of the formula (VI) and/or [lacuna].

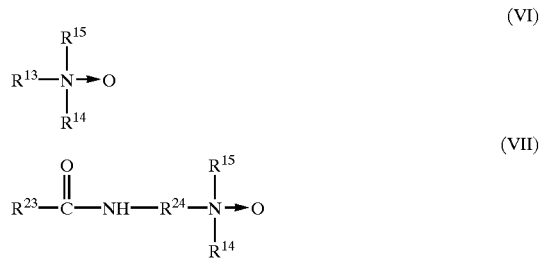

In the preparation of the amine oxides of the formula (VI), the starting materials are tertiary fatty amines which have at least one long alkyl radical; these are oxidized in the presence of hydrogen peroxide. In the amine oxides of the formula (VI) suitable for the purposes of the invention, $R^{13}$ is a linear or branched alkyl radical having 6 to 22, preferably 12 to 18, carbon atoms, and $R^{14}$ and $R^{15}$, independently of one another, are $R^{13}$ or an optionally hydroxy-substituted alkyl radical having 1 to 4 carbon atoms. Preference is given to using amine oxides of the formula (VI) in which $R^{13}$ and $R^{14}$ are $C_{12/14}$- or $C_{12/18}$-cocoalkyl radicals, and $R^{15}$ is a methyl or a hydroxyethyl radical. Likewise preferred are amine oxides of the formula (VI) in which $R^{13}$ is a $C_{12/14}$ or $C_{12/18}$-cocoalkyl radical and $R^{14}$ and $R^{15}$ have the meaning of a methyl or hydroxyethyl radical.

Further suitable amine oxides are alkylamidoamine oxides of the formula (VII), where the alkylamido radical $R^{23}CONH$ is formed by the reaction of linear or branched carboxylic acids, preferably having 6 to 22, preferably having 12 to 18, carbon atoms, in particular from $C_{12/14}$- or $C_{12/18}$-fatty acids with amines. Here, $R^{24}$ is a linear or branched alkylene group having 2 to 6, preferably 2 to 4, carbon atoms and $R^{14}$ and $R^{15}$ have the meaning given in formula (VI).

In a further embodiment, preference is given to mixtures which comprise the gemini surfactants of formula (I) and further nonionic surfactants in the ratio (a:c) 10:1 to 1:10, preferably 5:1 to 1:5 and particularly preferably 4:1 to 1:1.

The mixtures are preferably in solid form as shaped bodies, preferably as granules, powders, flakes, pellets or tablets.

Also claimed are dishwashing detergents and cleaners comprising 0.1 to 15% by weight of surfactants which comprise mixtures as in claim 1, 5 to 90% by weight of builders, 0.1 to 6% by weight of detergent enzyme, optionally 0.1 to 40% by weight of bleaches and further auxiliaries and additives. The designation % by weight refers to the overall composition.

The invention further provides for the use of the mixtures according to the invention as ingredients in laundry detergents, dishwashing detergents and cleaners. In addition to the mixtures according to the invention, these comprise further customary ingredients.

Examples of customary ingredients which may be used are solubility promoters, abrasive substances, builders, bleaches, enzymes, enzyme stabilizers, foam inhibitors, foam regulators, thickeners, fragrances, thickeners, dyes, disintegrants, antiredeposition agents, complexing agents and soil repellents. In this connection, reference is made expressly to the teaching of DE 199 53 796 A1 on pages 17 to 26.

The mixtures according to the invention are characterized by their higher melting points. This makes them particularly suitable for the simplified preparation of solid detergent formulations. Likewise, as a result of their higher melting points, the mixtures dissolve later in the cleaning liquor and develop their action in a time-delayed manner (controlled release) and in a higher concentration. This effect can be utilized particularly advantageously in solid combination products of detergent and rinse aid.

Furthermore, the use of the mixture according to the invention for the simplified preparation of solid detergent formulations, in particular for the preparation of machine dishwashing detergents, is preferred.

Very particular preference is given here to pulverulent or tablet dishwashing detergents which may at the same time also have a rinse aid function. Particular preference is given in this connection to the "2 in 1" and "3 in 1" formulations for automatic dishwashing.

One advantage of the mixtures according to the invention is that they are in solid form with a significantly higher melting point, in contrast to the "pure gemini surfactant".

The mixtures according to the invention can be converted by processes such as flaking, pelleting, extrusion, spray crystallization, drop formation and by drying and granulation in thin layers (flash dryer) into various shaped bodies which, as a result of their high melting points, can be handled and processed very readily during temperature fluctuations, e.g. during storage (summer-winter).

Processes

Accordingly, the invention further provides processes for the preparation of shaped bodies comprising the mixtures according to the invention. The shaped bodies can be prepared by processes such as flaking, pelleting, extrusion, spray crystallization, drop formation and/or drying and granulation in a thin layer (flash dryer). Likewise, two or more processes can be combined with one another.

Flaking

In this process, the molten mixture according to the invention is applied in a defined layer thickness to a roller or a belt, in most cases made of metal. In most cases, the surface of the roller or of the belt is actively cooled on the side which faces away from the product. If the product solidifies, it is removed from the roller or from the belt using blades. In the case of belts, the turning of the belt at the end point often suffices for the product to flake off. Where required, the flakes can be further changed into their particle size by further comminution processes.

Pelleting

The shaped bodies which comprise the mixtures according to the invention can be prepared by means of pelleting. In this process, the premix is applied to a perforated surface and forced through the holes by means of a pressurizing body with plasticization. In conventional versions of pelleting presses, the premix is compressed under pressure, plasticized, forced through a perforated surface by means of a rotating roll in the form of fine strands and finally comminuted using a chopping device to give granule particles. In this connection, very different designs of pressure rolls and perforated dies are conceivable. Thus, for example, flat perforated plates are as likely to be used as concave or convex annular dies, through which the material is pressed by means of one or more compression rolls. In the case of the plate devices, the pressure roll(s) can also be conical in form, and in the annular devices dies and pressure roll(s) can rotate in the same direction or in opposite directions. An apparatus suitable for carrying out the process is described, for example, in German laid-open specification DE 3816842 A1. The annular die press disclosed in this specification consists of a rotating annular die interspersed with compression channels and at least one pressure roll which is in effective connection with the internal surface thereof, which pressure roll presses the material introduced into the die cavity through the compression channels into a material discharge. In this connection, annular dies and pressure rolls can be operated in the same direction, as a result of which it is possible to achieve reduced shear stress and thus a lower temperature increase of the premix. However, it is of course also possible to use heatable or chillable rolls during pelleting in order to establish a desired temperature for the premix. In the case of pelleting too, the temperature of the pressing tools, i.e. of the compression rolls or pressure rolls, is preferably at most 150° C., preferably at most 100° C. and in particular at most 75° C. Particularly preferred preparation processes operate in the case of roll compaction with processing temperatures which are 10° C., in particular at most 5° C., above the melting point or the upper temperature limit of the melting range of the binder.

Extrusion

Shaped bodies comprising the mixtures according to the invention can also be prepared by means of extrusion, as described, for example, in European patent EP 0486592 B1 or international patent applications WO 93/02176 and WO 94/09111 or WO 98/12299. In this process, a solid premix is compressed under pressure in the form of an extrudate which, after leaving the perforated mold, is cut to the predeterminable granule dimension by means of a cutting device. The homogeneous and solid premix comprises a plasticizer and/or lubricant, which ensures that the premix softens in a plastic manner and becomes extrudable under the pressure or under the input of specific work. Preferred plasticizers and/or lubricants are surfactants and/or polymers. To explain the actual extrusion process, reference is made here expressly to the abovementioned patents and patent applications. Preferably, in this process, the premix is preferably fed to a planetary roll extruder or a twin-shaft extruder or twin-screw extruder with co- or counterrotating screw control, the barrel and extruder-granulation head of which may be heated to the predetermined extrusion temperature. Under the shear action of the extruder screws, the premix—under pressure, which is preferably at least 25 bar, but can also be below this value if throughputs are extremely high, depending on the apparatus used—is compressed, plasticized, extruded in the form of fine strands through the perforated die plate in the extruder head and, finally, the extrudate is comminuted by means of a rotating chopping blade to give, preferably, approximately spherical to cylindrical granules. The perforation diameter of the perforated die plate and the strand cutting length are tailored to the chosen granule dimension.

It is thus possible to prepare granules of an essentially uniformly predeterminable particle size, where in individual cases the absolute particle sizes can be matched to the intended use. In general, particle diameters up to at most 0.8 cm are preferred. Important embodiments provide here the preparation of uniform granules in the millimeter range, for example in the range from 0.5 to 5 mm and in particular in the range from about 0.8 to 3 mm. The length/diameter ratio of the chopped primary granules is here preferably in the range from about 1:1 to about 3:1.

It is further preferred to pass the still plastic primary granules to a further shaping stage; here, edges on the raw extrudate are rounded off, thus making it possible to ultimately obtain spherical to virtually spherical extrudate granules.

If desired, small amounts of dry powder, for example zeolite powder such as zeolite NaA powder, may also be used in this stage. This shaping may be carried out in commercial spheronizers. It is important here to ensure that only small amounts of fine particle fraction are formed in this stage. Drying, which is described in the abovementioned documents of the prior art, as a preferred embodiment, is then possible, but not necessarily required. It may even be preferred not to carry out any more drying after the compaction step. Alternatively, extrusions/compressions can also be carried out in low-pressure extruders, in the Kahl press (Amandus Kahl) or in the Bextruder from Bepex. Preferably, the temperature in the transition range of the screw, of the predivider and of the die plate is controlled in such a way that the melting temperature of binder or the upper limit of the melting range of the binder is at least reached, but is preferably exceeded. In this connection, the duration of the temperature action in the compression area of the extrusion is preferably less than 2 minutes and in particular in a range between 30 seconds and 1 minute.

Spray Crystallization

In this process, two or more single-substance pressure nozzles, so called solid-cone nozzles, are installed in the top of a spray tower, via which the feed substances are atomized into the spray tower. During this, the stream which emerges from the nozzle with high turbulence splits after traveling just a short distance from the mouth of the nozzle and forms drops, the tearing being additionally intensified by the impact of the stream. The crystallization product prepared in this manner has a broad particle size spectrum.

A particular type of spray crystallization is drop formation

Drop Formation

Also preferred is the preparation of the shaped bodies comprising the mixtures according to the invention by drop formation using a vibrating casting plate which is already known for the processing of synthetic waxes, resins and low-viscosity polyesters. Suitable components are sold, for example, by Rieter-Automatik under the trade name "Droppo line" for use in textile technology. For the purposes of the present invention, preference is given to those casting plates which are in the form of perforated disks, through the openings of which the drops can then drop into the spray tower. The throughput of such perforated disks can preferably be in the range from 100 to 800 kg/h and is in particular about 500 kg/h, the diameter of the bores is between 0.5 (diameter of the granules on average 0.8 mm) and 1.4 mm (diameter of the granules on average 2.5 mm). The oscillation frequency which is impressed on the aqueous surfactant preparations is typically in the range from 100 to 1,000 and preferably 500 to 800 Hz. A further advantage over conventional processes is also that it is possible to operate at a pressure only slightly above atmospheric pressure (typically: 10 to 100 mbar). Drying within the spray tower can be carried out countercurrently with hot air or hot combustion gases at temperatures of, for example, in the range from 100 to 150° C., as is adequately described in the prior art. The granules are almost spherical and, depending on the openings in the perforated plate and the frequency, have average diameters in the range from 1 to 2.5 mm. The dust fraction, i.e. particles with particle sizes less than 0.5 mm, is virtually zero in this process.

Drying and Granulation in the Thin Layer (Flash Dryer)

The simultaneous drying and granulation for the preparation of shaped bodies can take place in a horizontally arranged thin-layer evaporator with rotating internals, as is sold, for example, by VRV under the name "Flash Dryer". This, in simple terms, is a pipe which can be heated to different temperatures along a number of zones. Via one or more shafts, which are provided with blades or flight shares as rotating internals, the feed material, which is metered in by means of a pump, is thrown against the heated wall, where drying in a thin layer of typically 1 to 10 mm thickness takes place at temperatures of usually 100 to 200° C. The thin-layer evaporator is operated at atmospheric conditions or reduced pressure and gassed countercurrently with air (throughput 50 to 150 m$^3$/h). The entry temperature of the gas is usually 20 to 30° C., and the exit temperature is 100 to 130° C. The throughput amount is naturally dependent on the size of the dryer, but is typically 5 to 15 kg/h. When pastes are fed in, it is advisable to heat them to 40 to 60° C. After drying, it has also proven very advantageous to place the hot granules, which are still at about 30 to 50° C., onto a conveyor belt, preferably a vibrating undulation, where they are rapidly cooled, i.e. within a residence time of from 20 to 60 s. The mixtures according to the invention can here firstly be mixed with water (10 to 40% by weight) to better control the granulation.

EXAMPLES

Table 1 shows various mixtures and their melting points. C1 to C4 represent comparative examples, 1 to 11 are the examples according to the invention. The compositions are given directly in % by weight % by wt., based on the total mixture.

TABLE 1

| Composition in % by wt | C1 | C2 | C3 | C4 | 1 | 2 | 3 | 4 | 5 | 6 | 7 | 8 | 9 | 10 | 11 |
|---|---|---|---|---|---|---|---|---|---|---|---|---|---|---|---|
| 2-Hydroxydodecyl ether-PEG 600 2-hydroxydodecyl ether | 100 | — | — | — | 80 | — | 50 | — | 90 | — | 95 | 80 | 90 | 50 | 60 |
| 2-Hydroxydodecyl ether-PEG-1500 2-hydroxydodecyl ether | — | 100 | 80 | — | — | 80 | — | 50 | — | 90 | — | — | — | — | — |
| C12–14-FA + 5E0/4PO (Dehypon LS 54) | — | — | 20 | — | — | — | — | — | — | — | — | — | — | 30 | — |

TABLE 1-continued

| Composition in % by wt | C1 | C2 | C3 | C4 | 1 | 2 | 3 | 4 | 5 | 6 | 7 | 8 | 9 | 10 | 11 |
|---|---|---|---|---|---|---|---|---|---|---|---|---|---|---|---|
| C13–15-FA + 6EO/3PO (Symperonic RA 30) | — | — | — | 100 | — | — | — | — | — | — | — | — | — | — | 20 |
| PEG 1550 | — | — | — | — | — | — | — | 50 | — | — | — | — | — | — | — |
| PEG 3000 | — | — | — | — | 20 | 20 | 50 | — | 10 | 10 | 5 | — | — | 20 | 20 |
| PEG 12000 | — | — | — | — | — | — | — | — | — | — | — | 20 | 10 | — | — |
| Melting point [° C.] | 27 | 43 | 40 | liquid at RT | 54 | 54 | 56 | 46 | 55 | 47 | 54 | 65 | 65 | 54 | 53 |

RT: room temperature

What is claimed is:

1. A mixture comprising: (a) a gemini surfactant of the formula (I)

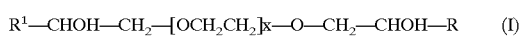

$$R^1—CHOH—CH_2—[OCH_2CH_2]_x—O—CH_2—CHOH—R \quad (I)$$

wherein each of R and $R^1$ is a linear or branched alkyl and/or alkenyl group having from 4 to 22 carbon atoms and x is a number from about 5 to about 400; and (b) polyethylene glycol.

2. The mixture of claim 1 wherein x has a value of from about 10 to about 100.

3. The mixture of claim 2 wherein x is from about 10 to about 50.

4. The mixture of claim 1 wherein each of R and $R^1$ is a linear alkyl radical having from 8 to 12 carbon atoms.

5. The mixture of claim 1 wherein the gemini surfactant is the product of the process comprising reacting a polyethylene glycol and an epoxyalkane such that at least 60% of all the free hydroxyl groups of the polyethylene glycol are reacted with the epoxyalkane.

6. The mixture of claim 5 wherein at least 90% of all the free hydroxyl groups of the polyethylene glycol are reacted with the epoxyalkane.

7. The mixture of claim 1 wherein the polyethylene glycol has a molecular weight of from about 500 to about 300,000 g/mol.

8. The mixture of claim 7 wherein the molecular weight is from about 1,000 to about 100,000.

9. The mixture of claim 8 wherein the molecular weight is from about 1,500 to about 50,000.

10. The mixture of claim 8 wherein the molecular weight is from about 1,550 to about 20,000.

11. The mixture of claim 1 wherein the value of x is from about 10 to about 50 and the molecular weight of the polyethylene glycol is from about 3,000 to about 20,000 g/mol.

12. The mixture of claim 1 wherein the mole ratio of a:b is from about 100:1 to about 1:1.

13. The mixture of claim 12 wherein the mole ratio is from about 20:1 to about 1:1.

14. The mixture of claim 12 wherein the mole ratio is from about 10:1 to about 2:1.

15. The mixture of claim 1 further comprising component (c) which is a nonionic surfactant selected from the group consisting of an alkyl and/or alkenyl oligoglycoside, an alkoxylate of an alkanol, a terminally capped alkoxylate of an alkanol having no free OH groups, an alkoxylated fatty acid lower alkyl ester and an amine oxide.

16. The mixture of claim 1 further comprising an alkyl and/or alkenyl oligoglycoside of the formula (II)

$$R^2O—[G]_p \quad (II)$$

wherein $R^2$ is an alkyl and/or alkenyl radical having from 4 to 22 carbon atoms, G is a sugar radical having 5 or 6 carbon atoms and p is a number from 1 to 10; a fatty alcohol polyethylene glycol/polypropylene glycol ether of the formula (III)

$$R^6O(CH_2CH_2O)_{n1}[CH_2(CH_3)CHO]_mR^7 \quad (III)$$

wherein $R^6$ is a linear or branched alkyl and/or alkenyl radical having from 8 to 22 carbon atoms, $R^7$ is H or an alkyl radical having from 1 to 8 carbon atoms, n1 is a number from 1 to about 40 and m is 0 or a number from 1 to 10; a fatty alcohol polypropylene glycol/polyethylene glycol ether of the formula (IV)

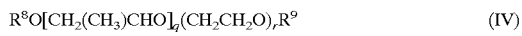

$$R^8O[CH_2(CH_3)CHO]_q(CH_2CH_2O)_rR^9 \quad (IV)$$

wherein $R^8$ is an alkyl and/or alkenyl radical having from 8 to 22 carbon atoms, $R^9$ is H or an alkyl radical having from 1 to 8 carbon atoms, q is a number from 1 to 5 and r is a number from 0 to 15.

17. The mixture of claim 15 wherein the weight ratio of the gemini surfactant to the other nonionic surfactant (c) is from about 10:1 to about 1:10.

18. The mixture of claim 17 wherein the weight ratio is from about 5:1 to about 1:5.

19. The mixture of claim 17 wherein the weight ratio is from about 4:1 to about 1:1.

20. A dishwashing detergent or cleaner comprising from about 0.1 to about 15% by weight of the mixture of claim 1; from 0.1 to 6% by weight of a detergent enzyme; optionally from about 0.1 to about 40% by weight of a bleach.

21. A process for the preparation of shaped bodies comprising the mixture of claim 1 comprising forming the shaped body by flaking, pelleting, extrusion, spray crystallization, drop formation and/or by drying and granulation.

* * * * *